US012258096B2

(12) United States Patent
Suzuki et al.

(10) Patent No.: US 12,258,096 B2
(45) Date of Patent: Mar. 25, 2025

(54) SADDLE-RIDE VEHICLE

(71) Applicant: HONDA MOTOR CO., LTD., Tokyo (JP)

(72) Inventors: Tomohiro Suzuki, Tokyo (JP); Masayuki Hiramaru, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 631 days.

(21) Appl. No.: 17/696,465

(22) Filed: Mar. 16, 2022

(65) Prior Publication Data

US 2022/0315160 A1 Oct. 6, 2022

(30) Foreign Application Priority Data

Mar. 31, 2021 (JP) ................. 2021-061448

(51) Int. Cl.
*B62K 25/28* (2006.01)
*B62K 25/32* (2006.01)

(52) U.S. Cl.
CPC ............ *B62K 25/283* (2013.01); *B62K 25/32* (2013.01)

(58) Field of Classification Search
CPC ......... B62K 25/283; B62K 25/32; B62M 9/16
See application file for complete search history.

(56) References Cited

U.S. PATENT DOCUMENTS

| | | | | |
|---|---|---|---|---|
| 4,800,979 A | * | 1/1989 | Tatsuji | B62K 25/283 180/227 |
| 6,499,553 B2 | * | 12/2002 | Suzuki | B62K 5/01 180/251 |
| 9,033,090 B2 | * | 5/2015 | Kuwabara | B62K 25/283 248/65 |
| 11,001,335 B2 | * | 5/2021 | Kurakawa | B62K 25/28 |
| 11,072,387 B2 | * | 7/2021 | Kurakawa | B62K 25/28 |
| 11,919,593 B2 | * | 3/2024 | Mayuzumi | B62J 13/02 |
| 2007/0152423 A1 | | 7/2007 | Waters | |

(Continued)

FOREIGN PATENT DOCUMENTS

| | | |
|---|---|---|
| EP | 1134152 A2 | 9/2001 |
| EP | 2 447 138 A1 | 5/2012 |
| JP | S59-184288 U | 12/1984 |

(Continued)

OTHER PUBLICATIONS

German Office Action dated Apr. 9, 2024 issued in corresponding German application No. 10 2022 106 611.8 (5 pages).

(Continued)

*Primary Examiner* — Kevin Hurley
*Assistant Examiner* — Michael R Stabley
(74) *Attorney, Agent, or Firm* — Rankin, Hill & Clark LLP

(57) ABSTRACT

A saddle-ride vehicle includes a chain slider. The chain slider is integrally provided with an upper slider portion, a lower slider portion, and a vertical connection portion, while the chain slider has an open loop shape in which a front end portion of the upper slider portion and a front end portion of the lower slider portion are formed to be separable from each other. A swingarm has an engagement projection that is provided in a front portion of the swingarm and that protrudes outward from a surface of the swingarm. The front end portion and the front end portion engage, while overlapping with each other, with the engagement projection.

9 Claims, 7 Drawing Sheets

(56) References Cited

U.S. PATENT DOCUMENTS

2019/0176927 A1    6/2019  Kurakawa et al.
2019/0176928 A1*   6/2019  Kurakawa .............. B62K 25/28

FOREIGN PATENT DOCUMENTS

| JP | H03-045911 Y | 9/1991 |
| JP | H5-305894 A  | 11/1993 |
| JP | H8-253184 A  | 10/1996 |
| JP | 2004-262282 A | 9/2004 |
| JP | 2014-019230 A | 2/2014 |
| JP | 5593203 B2   | 9/2014 |
| JP | 6648097 B2   | 2/2020 |

OTHER PUBLICATIONS

Indian Office Action dated Nov. 21, 2022 issued in corresponding Indian application No. 202244018286; English translation included (5 pages).
Brazilian Office Action Corresponding to Application No. BR102022003793-0, mailing date Sep. 10, 2024, 4 pages.

\* cited by examiner ary Field

The present invention relates to a saddle-ride vehicle.

Related Art

There is known a conventional saddle-ride vehicle which includes a swingarm swingably supporting a wheel, a chain disposed along an upper surface and a lower surface of the swingarm and transmitting driving force of a power unit to the wheel, and a chain slider attached to the swingarm and having sliding contact with the chain (see, for example, JP 2004-262282 A and JP H03-045911 Y).

In JP 2004-262282 A, the chain slider has an open loop shape in which a rear end of the chain slider is opened. The chain slider is fixed to the swingarm by engagement. Specifically, in the engagement, projections provided in the chain slider engage with hole portions provided in the swingarm. End portions of the chain slider also engage with two respective engagement portions protruding inward from an inner wall of the swingarm. Thus, the chain slider can be easily fixed to the swingarm.

In JP H03-045911 Y, the chain slider is formed in a closed loop shape in vehicle side view, and is fixed to the swingarm by fitting the chain slider to the swingarm. In this structure, the closed looped chain slider is provided so as to be wound around the swingarm. Thus, the chain slider can be securely fixed to the swingarm without engaging the chain slider with hole portions of the swingarm.

SUMMARY

In a case where the end portions of the open looped chain slider engage with the two respective engagement portions provided inward of the swingarm as disclosed in JP 2004-262282 A, the engagement portions are not exposed, and thus appearance is improved. However, the end portions of the open looped chain slider are attached to the respective engagement portions while the engagement portions are hardly visible. This may make the attachment complicated.

In a case where the chain slider has a closed loop shape as disclosed in JP H03-045911 Y, it is necessary to remove the wheel to attach and detach the chain slider to and from the swingarm. It may take time and effort to attach and detach the chain slider.

The present invention has been made in view of the above circumstances, and it is an object of the present invention to enable a chain slider to be easily attached to and detached from a swingarm in a saddle-ride vehicle.

A saddle-ride vehicle includes a swingarm that extends in a vehicle front-rear direction and that swingably supports a wheel, a chain that is disposed along an upper surface and a lower surface of the swingarm and that transmits driving force of a power unit to the wheel, and a chain slider that is configured to be attached to the swingarm and that is configured to have sliding contact with the chain. The chain slider is integrally provided with an upper slider portion that is configured to be attached to the upper surface of the swingarm, a lower slider portion that is configured to be attached to the lower surface of the swingarm, and a vertical connection portion that vertically connects a rear end portion of the upper slider portion and a rear end portion of the lower slider portion, while the chain slider has an open loop shape in which a front end portion of the upper slider portion and a front end portion of the lower slider portion are formed to be separable from each other. The swingarm has an engagement projection that is provided in a front portion of the swingarm and that protrudes outward from a surface of the swingarm. The front end portion of the upper slider portion and the front end portion of the lower slider portion are configured to engage with the engagement projection in a state where the front end portion of the upper slider portion and the front end portion of the lower slider portion overlap with each other.

In the above configuration, the front end portion of the upper slider portion may engage with the engagement projection while the front end portion of the upper slider portion overlaps, from an outer side of the front end portion of the lower slider portion, with the front end portion of the lower slider portion that engages with the engagement projection.

Further, in the above configuration, the vertical connection portion may abut on an inner side surface, in a vehicle width direction, of the swingarm.

In the above configuration, the chain slider may include a positioning portion that is configured to abut on an outer side surface, in the vehicle width direction, of the swingarm.

Further, in the above configuration, the chain slider may include an extending portion that is provided frontward of the vertical connection portion and that extends, along a side surface of the swingarm, from at least one of the upper slider portion or the lower slider portion. The extending portion may engage with a protruding portion that is provided on the side surface.

In the above configuration, the extending portion may include a hole portion into which the protruding portion is inserted, and a guide surface that has an annular shape and that is provided around the hole portion. A groove portion may be provided on an outer periphery of the protruding portion. The hole portion may engage with the groove portion, and the guide surface may have a tapered shape whose diameter decreases toward a tip end of the protruding portion.

Further, in the above configuration, a chain cover that covers the chain from above may be provided, and the chain cover may include an attachment portion that is configured to be attached to the protruding portion. The extending portion may be retained so as not to come off by the attachment portion.

In the above configuration, the engagement projection may protrude frontward from a front surface of the swingarm.

Further, in the above configuration, in an overlapping portion where the front end portion of the upper slider portion and the front end portion of the lower slider portion overlap with each other, the front end portions may overlap with each other, in the vehicle front-rear direction, in front of the front surface of the swingarm.

The saddle-ride vehicle includes the swingarm that extends in the vehicle front-rear direction and that swingably supports the wheel, the chain that is disposed along the upper surface and the lower surface of the swingarm and that transmits the driving force of the power unit to the wheel, and the chain slider that is configured to be attached to the swingarm and that is configured to have sliding contact with the chain. The chain slider is integrally provided with the upper slider portion that is configured to be attached to the upper surface of the swingarm, the lower slider portion that is configured to be attached to the lower surface of the swingarm, and the vertical connection portion that vertically connects the rear end portion of the upper slider portion and the rear end portion of the lower slider portion, while the chain slider has an open loop shape in which the front end portion of the upper slider portion and the front end portion of the lower slider portion are formed to be separable from each other. The swingarm has the engagement projection that is provided in the front portion of the swingarm and that protrudes outward from the surface of the swingarm. The front end portion of the upper slider portion and the front end portion of the lower slider portion are configured to engage with the engagement projection in the state where the front end portion of the upper slider portion and the front end portion of the lower slider portion overlap with each other.

According to this configuration, when the open looped chain slider is attached to the swingarm, the front end portion of the upper slider portion and the front end portion of the lower slider portion engage with the engagement projection in a state where the front end portion of the upper slider portion and the front end portion of the lower slider portion overlap with each other. Then, the shape of the chain slider is changed into a closed loop shape. Therefore, when the attachment is performed, the open looped chain slider is engaged with the swingarm. Thus, the chain slider can be easily attached to and detached from the swingarm without detaching the wheel. Further, after the chain slider is engaged with the engagement projection, the shape of the chain slider is changed into a closed loop shape. Thus, the chain slider can be fixed to the swingarm without bolt fastening, or engagement made through a large number of engagement portions. This eliminates the need to provide, in the swingarm, a large number of hole portions for fastening or engagement. Therefore, the elimination of the need to provide a large number of hole portions easily ensures rigidity of the swingarm, increases a degree of freedom in shape of the swingarm, and contributes to downsizing.

In the above configuration, the front end portion of the upper slider portion may engage with the engagement projection while the front end portion of the upper slider portion overlaps, from the outer side of the front end portion of the lower slider portion, with the front end portion of the lower slider portion that engages with the engagement projection.

According to this configuration, the front end portion of the upper slider portion overlaps with the front end portion of the lower slider portion from the outer side. Thus, a connecting portion between the front end portion of the upper slider portion and the front end portion of the lower slider portion is hardly seen from above. Therefore, appearance is improved. In addition, dust, water, and the like hardly enter between the front end portion of the upper slider portion and the front end portion of the lower slider portion from above. Thus, the chain slider has a high antifouling property.

Further, in the above configuration, the vertical connection portion may abut on the inner side surface, in the vehicle width direction, of the swingarm.

According to this configuration, the rear end portions of the chain slider can be positioned in the vehicle width direction and in the front-rear direction by the vertical connection portion. In addition, the vertical connection portion is covered over by the swingarm from an outer side in the vehicle width direction. Thus, appearance is improved.

In the above configuration, the chain slider may include the positioning portion that is configured to abut on the outer side surface, in the vehicle width direction, of the swingarm.

According to this configuration, the chain slider can be positioned in the vehicle width direction by the positioning portion.

Further, in the above configuration, the chain slider may include the extending portion that is provided frontward of the vertical connection portion and that extends, along the side surface of the swingarm, from at least one of the upper slider portion or the lower slider portion. The extending portion may engage with the protruding portion that is provided on the side surface.

According to this configuration, the extending portion engages with the protruding portion on the side surface of the swingarm. Thus, the chain slider can be positioned also on the outer side surface in the width direction without providing a hole portion in the swingarm.

In the above configuration, the extending portion may include the hole portion into which the protruding portion is inserted, and the guide surface that has an annular shape and that is provided around the hole portion. The groove portion may be provided on the outer periphery of the protruding portion. The hole portion may engage with the groove portion, and the guide surface may have a tapered shape whose diameter decreases toward the tip end of the protruding portion.

According to this configuration, the hole portion of the extending portion engages with the groove portion on the outer periphery of the protruding portion. Thus, the chain slider can be positioned in the front-rear direction, in the vehicle width direction, and in the vertical direction. In addition, the guide surface has a tapered shape, and thus the hole portion can be easily attached to the protruding portion.

Further, in the above configuration, the chain cover that covers the chain from above may be provided, and the chain cover may include an attachment portion that is configured to be attached to the protruding portion. The extending portion may be retained so as not to come off by the attachment portion.

According to this configuration, the extending portion of the chain slider can be supported by using the protruding portion to which the chain cover is further attached. In addition, the extending portion can be retained so as not to come off with a simple structure using the attachment portion of the chain cover.

In the above configuration, the engagement projection may protrude frontward from the front surface of the swingarm.

According to this configuration, the engagement projection is provided on the front surface of the swingarm. Thus, the engagement projection does not interfere with the chain that is disposed along the upper surface and the lower surface of the swingarm. Therefore, the engagement projection can be provided without causing any influence on the chain.

Further, in the above configuration, in the overlapping portion where the front end portion of the upper slider portion and the front end portion of the lower slider portion overlap with each other, the front end portions may overlap with each other, in the vehicle front-rear direction, in front of the front surface of the swingarm.

According to this configuration, the overlapping portion can be spaced from the chain that is disposed along the upper surface and the lower surface of the swingarm. Thus, contact of the chain with the overlapping portion can be avoided.

DETAILED DESCRIPTION

Figure 1:
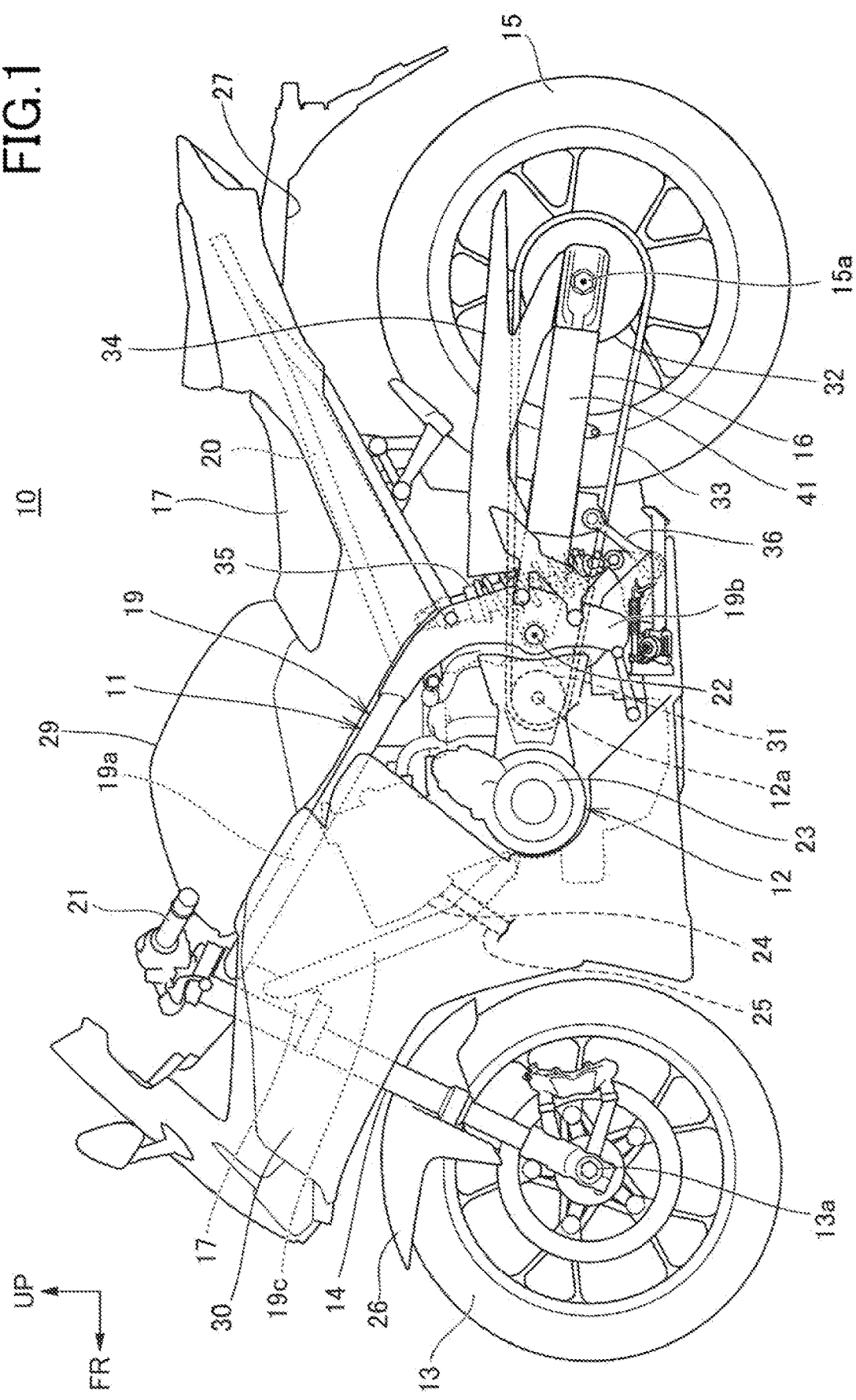
FIG. 1 is a side view illustrating a saddle-ride vehicle according to an embodiment of the present invention.

Hereinafter, an embodiment of the present invention will be described with reference to the drawings. In the description, directions such as front and rear, left and right, and upper and lower (or vertical) are the same as the directions with respect to a vehicle body unless otherwise specified. In the drawings, reference sign FR denotes the front side of the vehicle body, reference sign UP denotes the upper side of the vehicle body, and reference sign LH denotes the left side of the vehicle body.

Embodiment

FIG. 1 is a side view illustrating a saddle-ride vehicle 10 according to an embodiment of the present invention.

The saddle-ride vehicle 10 is a vehicle including a vehicle body frame 11, a power unit 12 supported by the vehicle body frame 11, a front fork 14 supporting a front wheel 13 in a freely steerable manner, a swingarm 16 supporting a rear wheel 15, and a seat 17 for a rider.

The saddle-ride vehicle 10 is a vehicle in which the rider is seated in a straddling manner on the seat 17. The seat 17 is provided on an upper side of a rear portion of the vehicle body frame 11.

The vehicle body frame 11 includes a head pipe 18, a front frame 19, and a rear frame 20. The head pipe 18 is provided at a front end portion of the vehicle body frame 11. The front frame 19 is located rearward of the head pipe 18. The rear frame 20 is located rearward of the front frame 19. A front end portion of the front frame 19 is connected to the head pipe 18.

The seat 17 is supported by the rear frame 20.

The front fork 14 is supported by the head pipe 18 in a freely steerable manner in the left-right direction. The front wheel 13 is supported by an axle 13a provided at a lower end portion of the front fork 14. A steering handlebar 21 gripped by the rider is attached to an upper end portion of the front fork 14.

The swingarm 16 is supported by a pivot shaft 22, which is further supported by the vehicle body frame 11. The pivot shaft 22 is a shaft extending horizontally in a vehicle width direction. Insertion of the pivot shaft 22 is made in a front end portion of the swingarm 16. The swingarm 16 vertically swings about the pivot shaft 22.

The rear wheel 15 is supported by an axle 15a provided at a rear end portion of the swingarm 16.

The power unit 12 is disposed between the front wheel 13 and the rear wheel 15, and is supported by the vehicle body frame 11.

The power unit 12 is an internal combustion engine. The power unit 12 includes a crankcase 23, and a cylinder unit 24 that houses a reciprocating piston. The cylinder unit 24 has an exhaust port, to which an exhaust device 25 is connected.

Output of the power unit 12 is transmitted to the rear wheel 15 through a driving force transmitting member connecting the power unit 12 and the rear wheel 15.

The saddle-ride vehicle 10 also includes a front fender 26 covering the front wheel 13 from above, a rear fender 27 covering the rear wheel 15 from above, steps 28 on which the rider places his/her feet, and a fuel tank 29 storing fuel used by the power unit 12.

The front fender 26 is attached to the front fork 14. The rear fender 27 and the steps 28 are provided below the seat 17. The fuel tank 29 is supported by the vehicle body frame 11.

The front frame 19 includes a pair of left and right main frames 19a extending rearward and downward from the head pipe 18, pivot frames 19b extending downward from rear end portions of the main frames 19a, and a pair of left and right down frames 19c extending downward from a position, in the head pipe 18, below a front end of the main frames 19a.

The saddle-ride vehicle 10 also includes a vehicle body cover 30 covering the vehicle body including the vehicle body frame 11 and the power unit 12.

The power unit 12 has an output shaft 12a, which protrudes toward an outer side, in the vehicle width direction, from a rear portion of the crankcase 23. A drive sprocket 31 is fixed to the output shaft 12a.

A driven sprocket 32 is fixed to the rear wheel 15 (wheel).

The driving force transmitting member is an endless chain 33, which connects the drive sprocket 31 and the driven sprocket 32.

A chain cover 34 covering the chain 33 from above is attached to the swingarm 16.

The saddle-ride vehicle 10 also includes a cushion unit 35 stretched between the swingarm 16 and the vehicle body.

The cushion unit 35 has a rod shape extending in the vertical direction. An upper end portion of the cushion unit 35 is connected to the vehicle body. A lower end portion of the cushion unit 35 is connected to the swingarm 16 through a link mechanism 36.

Figure 2:
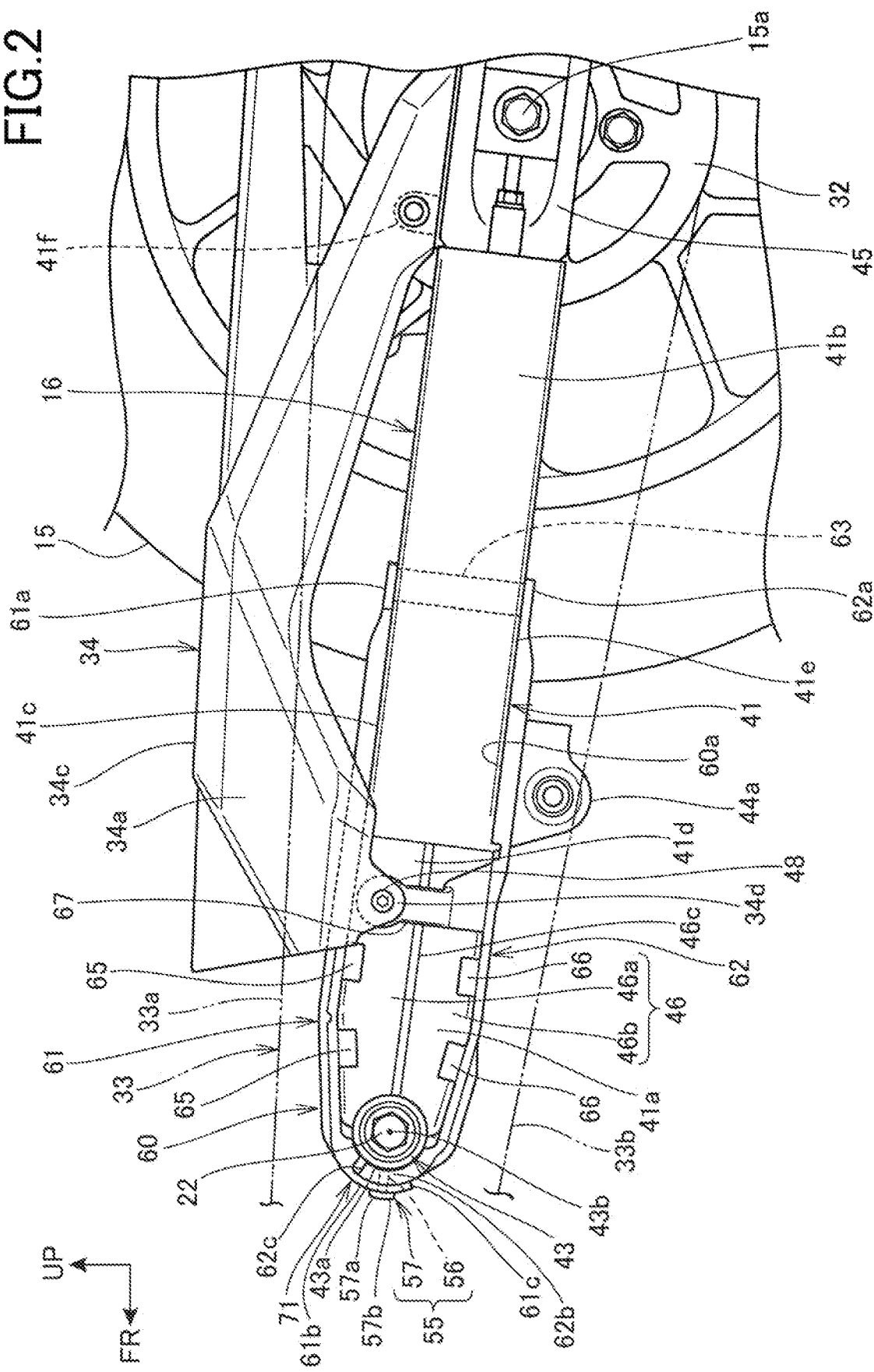
FIG. 2 is a left side view illustrating a swingarm and a rear wheel.
Figure 3:
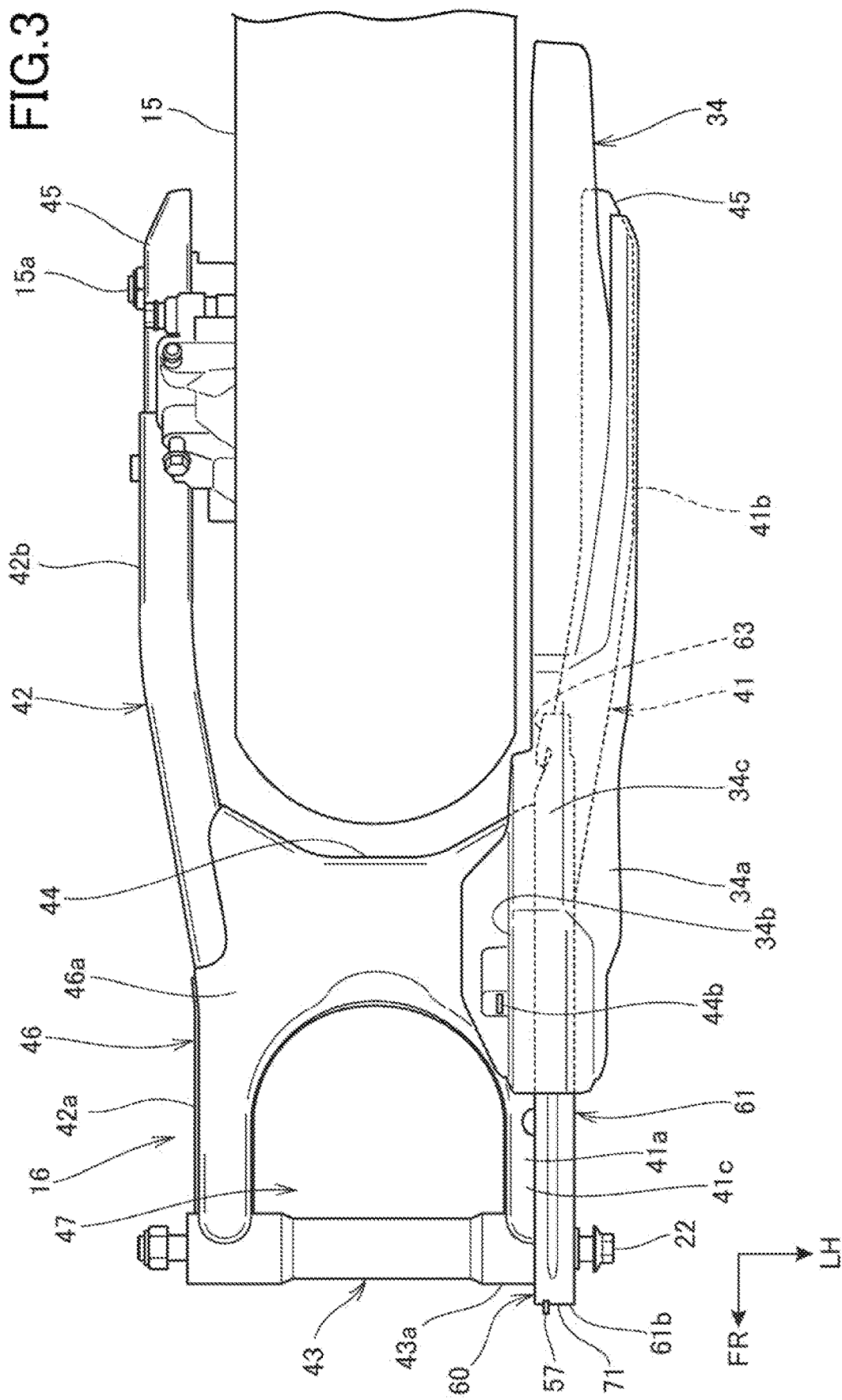
FIG. 3 is a plan view illustrating the swingarm and the rear wheel as viewed from above.

FIG. 2 is a left side view illustrating the swingarm 16 and the rear wheel 15. FIG. 3 is a plan view illustrating the swingarm 16 and the rear wheel 15 as viewed from above.

Referring to FIGS. 2 and 3, the swingarm 16 includes a pair of left and right arm portions 41, 42, a pivot coupling portion 43, and a cross member 44. The left and right arm portions 41, 42 extend in a vehicle front-rear direction. The pivot coupling portion 43 is provided at front end portions of the arm portions 41, 42. The cross member 44 connects the left and right arm portions 41, 42 in the vehicle width direction (left-right direction), and this connection is made rearward of the pivot coupling portion 43.

The rear wheel 15 is disposed, rearward of the cross member 44, between the left and right arm portions 41, 42. The rear wheel 15 is supported by the axle 15a connecting rear end portions of the arm portions 41, 42 in the vehicle width direction.

The driven sprocket 32 is provided on a side on one of left and right sides (the left side) at the rear wheel 15.

The chain 33 extends in the vehicle front-rear direction along the arm portion 41 on the one of the left and right sides (the left side).

A chain slider 60 receiving the chain 33 is attached to the swingarm 16. The chain cover 34 is provided along the arm portion 41.

Figure 4:
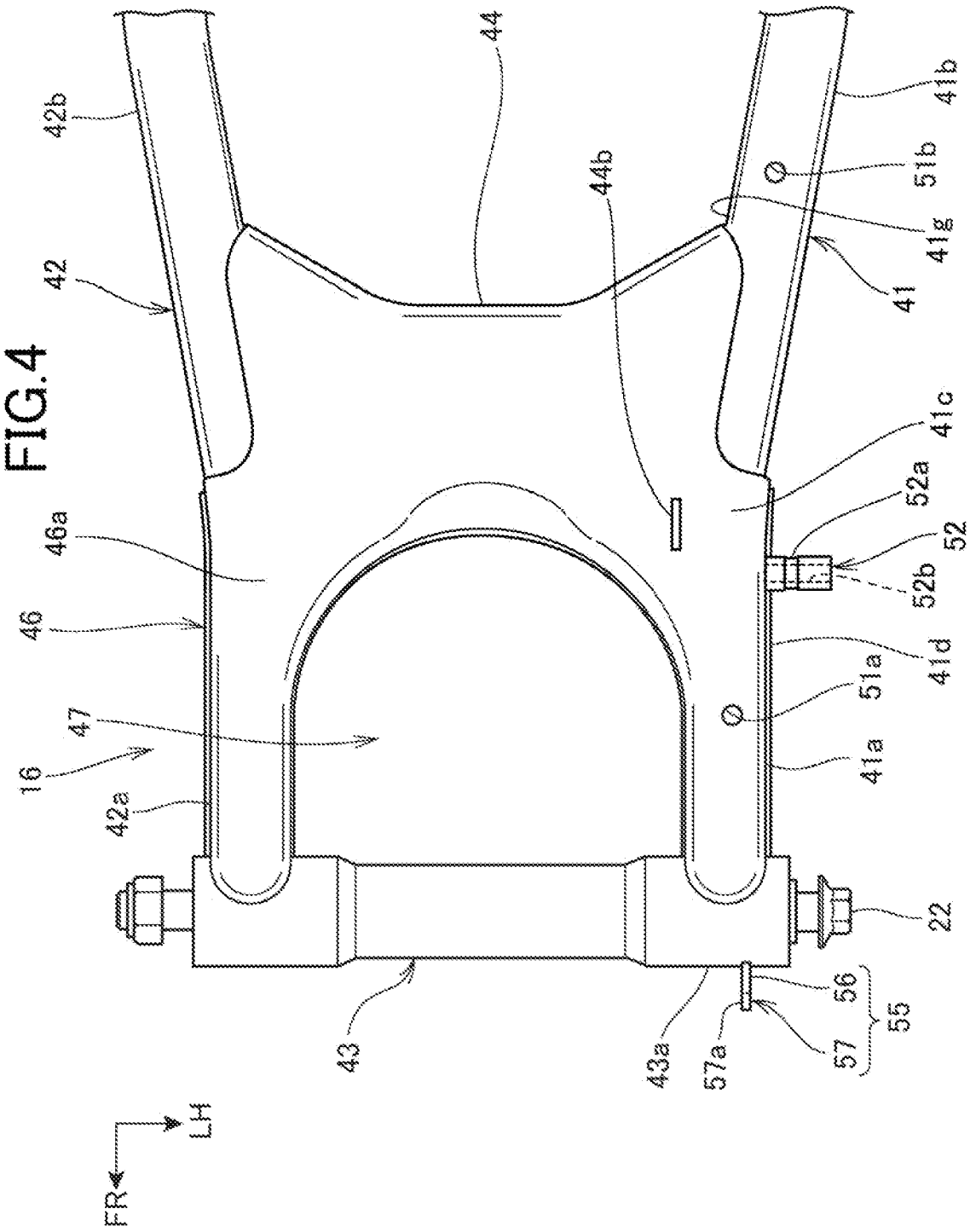
FIG. 4 is a plan view illustrating a front portion of the swingarm as viewed from above.

FIG. 4 is a plan view illustrating a front portion of the swingarm 16 as viewed from above.

Referring to FIGS. 2 to 4, the pivot coupling portion 43 is a cylindrical member extending in the vehicle width direction. The pivot coupling portion 43 connects the front end portions of the arm portions 41, 42 in the vehicle width direction.

The pivot shaft 22 is inserted into the cylinder of the pivot coupling portion 43. The pivot shaft 22 supports the pivot coupling portion 43 through bearings (not illustrated) disposed in the cylinder of the pivot coupling portion 43.

The pivot coupling portion 43 is supported by the pivot shaft 22 in a state where the pivot coupling portion 43 is sandwiched between the pair of left and right pivot frames 19b (illustrated in FIG. 1).

The arm portions 41, 42 linearly extend rearward and downward in vehicle side view.

The left arm portion 41 includes a front arm portion 41a connected to the pivot coupling portion 43, and a rear arm portion 41b extending rearward from a rear end of the front arm portion 41a.

The arm portion 42 on the other of the left and right sides (the right side) includes a front arm portion 42a connected to a rear surface of the pivot coupling portion 43, and a rear arm portion 42b extending rearward from a rear end of the front arm portion 42a.

The rear arm portion 41b and the rear arm portion 42b are pipe members extending in the vehicle front-rear direction. The rear arm portion 41b and the rear arm portion 42b are rectangular pipe members manufactured by, for example, metal extrusion or drawing.

A block-shaped end piece 45 supporting the axle 15a is coupled to each of a rear end portion of the rear arm portion 41b and a rear end portion of the rear arm portion 42b.

The swingarm 16 is formed by joining the pivot coupling portion 43, a front hollow member 46 disposed rearward of the pivot coupling portion 43, the rear arm portion 41b and the rear arm portion 42b, and the end pieces 45, by means of welding, for example.

The front hollow member 46 includes the front arm portion 41a, the front arm portion 42a, and the cross member 44.

A front end of the front arm portion 41a and a front end of the front arm portion 42a are connected to the rear surface of the pivot coupling portion 43. The cross member 44 connects a rear portion of the front arm portion 41a and a rear portion of the front arm portion 42a in the vehicle width direction.

The front hollow member 46 is formed in a hollow case shape by vertically joining an upper divided body 46a constituting an upper portion of the front hollow member 46, and a lower divided body 46b constituting a lower portion of the front hollow member 46. A dividing plane 46c of the upper divided body 46a and the lower divided body 46b linearly extends in an axial direction of the arm portions 41, 42 in vehicle side view.

The upper divided body 46a and the lower divided body 46b are pressed products manufactured by pressing plate members. The front arm portion 41a and the front arm portion 42a have a rectangular pipe shape.

Front end portions of the rear arm portion 41b and the rear arm portion 42b are connected to a rear portion of the front hollow member 46. The rear arm portion 41b and the rear arm portion 42b extend rearward from the front hollow member 46.

The cross member 44 is also connected to the front end portion of the rear arm portion 41b and the front end portion of the rear arm portion 42b. Thus, the cross member 44 connects the rear arm portion 41b and the rear arm portion 42b in the vehicle width direction.

The rear arm portion 41b and the rear arm portion 42b are inclined, in plan view, so as to be located on the outer sides in the vehicle width direction as they extend rearward.

An opening portion 47 is provided in the front portion of the swingarm 16, and is surrounded by the pivot coupling portion 43, the cross member 44, and the left and right front arm portions 41a, 42a.

A link connection portion 44a, to which the link mechanism 36 is connected, is provided on a lower surface of the cross member 44.

The cushion unit 35 (illustrated in FIG. 1) passes through the opening portion 47 and extends downward of the swingarm 16, and is connected to the link mechanism 36.

Referring to FIG. 4, holes 51a, 51b are provided on an upper surface 41c of the arm portion 41. The hole 51a on a front side is provided in the front arm portion 41a. The hole 51b on a rear side is provided in the rear arm portion 41b.

An engagement piece 44b protruding upward is provided, in the vicinity of the arm portion 41, on an upper surface of the cross member 44.

A protruding portion 52 protruding toward the outer side in the vehicle width direction is provided on an outer side surface 41d (side surface), in the vehicle width direction, of the arm portion 41. The protruding portion 52 is provided on a portion of the upper divided body 46a, in the front arm portion 41a.

The protruding portion 52 is a cylindrical shaft extending in the vehicle width direction.

On an outer periphery of the protruding portion 52, an annular groove portion 52a is provided so as to run around the outer periphery. The groove portion 52a is provided at an intermediate portion in an axial direction of the protruding portion 52.

A screw hole 52b is provided on an inner periphery of the protruding portion 52.

The pivot coupling portion 43 has a cylindrical shape, and thus a front surface 43a of the pivot coupling portion 43 has an arc shape. The front surface 43a is also a front surface of the swingarm 16.

Referring to FIGS. 2 to 4, the swingarm 16 includes an engagement projection 55 protruding frontward (or outward) from the front surface 43a (or surface). The engagement projection 55 has a plate shape, and is disposed such that a plate thickness direction thereof coincides with the vehicle width direction.

The engagement projection 55 includes a frontward extending portion 56 extending frontward from the front surface 43a, and a claw portion 57 protruding in the vertical direction from a front end portion of the frontward extending portion 56.

The claw portion 57 includes an upper claw portion 57a protruding upward from the frontward extending portion 56, and a lower claw portion 57b protruding downward from the frontward extending portion 56.

The engagement projection 55 is disposed at the same position, in the vehicle width direction, as that of the front end portion of the left arm portion 41.

Referring to FIGS. 1 and 2, an upper portion 33a of the chain 33 extends frontward and rearward along and above the upper surface 41c of the arm portion 41.

A lower portion 33b of the chain 33 extends frontward and rearward along and below a lower surface 41e of the arm portion 41.

When the saddle-ride vehicle 10 is driven by driving force of the power unit 12, the upper portion 33a moves frontward and the lower portion 33b moves rearward.

The upper portion 33a overlaps with the upper surface 41c from above, and the lower portion 33b overlaps with the lower surface 41e from below.

Referring to FIGS. 2 and 3, the chain cover 34 includes an outer wall portion 34a, an inner wall portion 34b, and an upper wall portion 34c. The outer wall portion 34a covers the upper portion 33a of the chain 33 from the outer side in the vehicle width direction. The inner wall portion 34b covers the upper portion 33a from an inner side in the vehicle width direction. The upper wall portion 34c connects an upper end of the outer wall portion 34a and an upper end of the inner wall portion 34b in the vehicle width direction.

An attachment portion 34d is provided in a lower front end portion of the outer wall portion 34a, and is attached to the swingarm 16.

The attachment portion 34d is fastened to an outer end surface of the protruding portion 52 of the arm portion 41 by a fastener 48 inserted into a hole of the attachment portion 34d from the outer side in the vehicle width direction. The fastener 48 is screwed into the screw hole 52b of the protruding portion 52.

The chain cover 34 is fixed to the swingarm 16 further by engaging a lower end portion of the inner wall portion 34b with the engagement piece 44b.

Further, a rear end portion of the chain cover 34 is fastened to a stay 41f (illustrated in FIG. 2) provided in a rear end portion of the arm portion 41.

Figure 5:
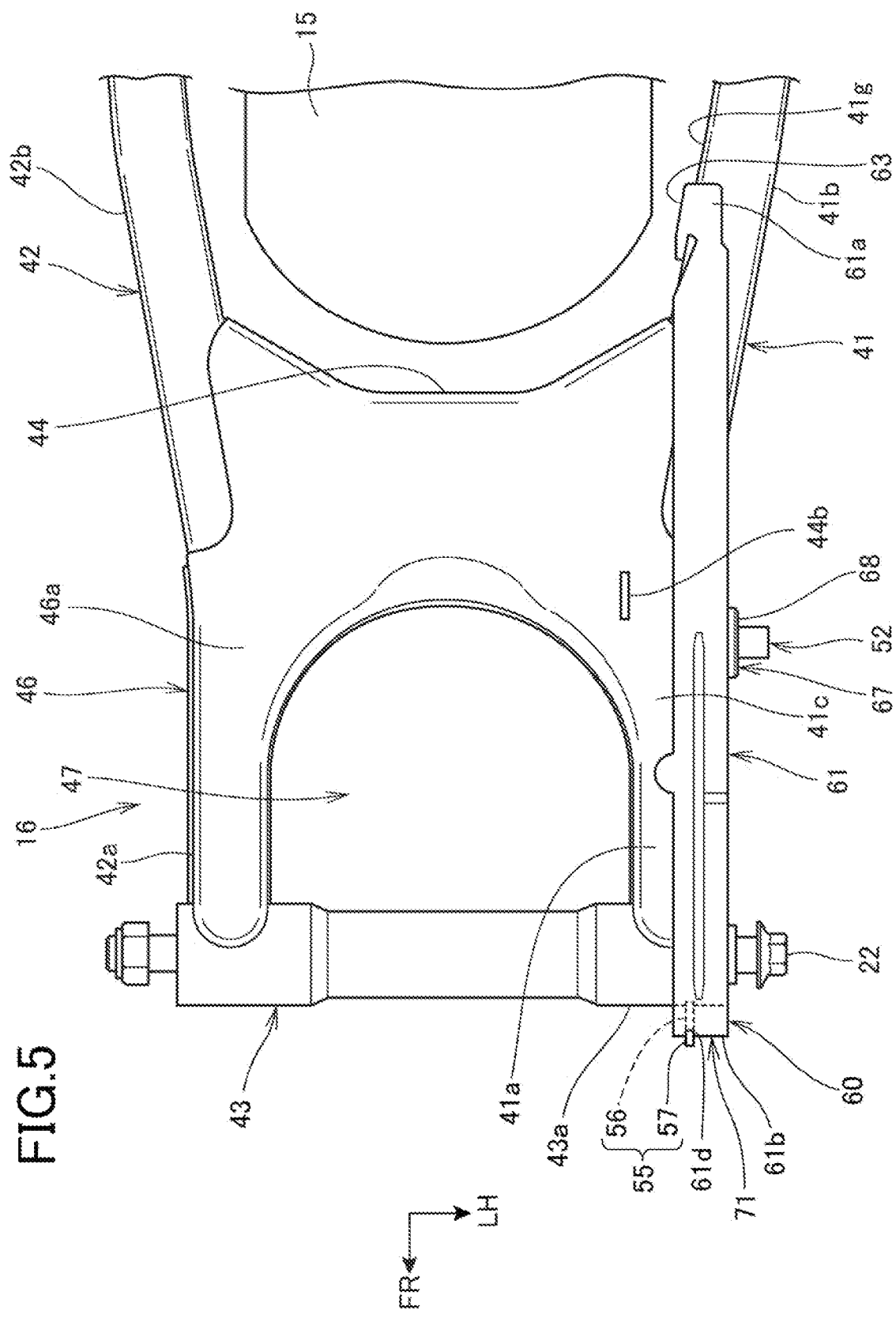
FIG. 5 is a plan view illustrating the swingarm to which a chain slider has been attached, as viewed from above.
Figure 6:
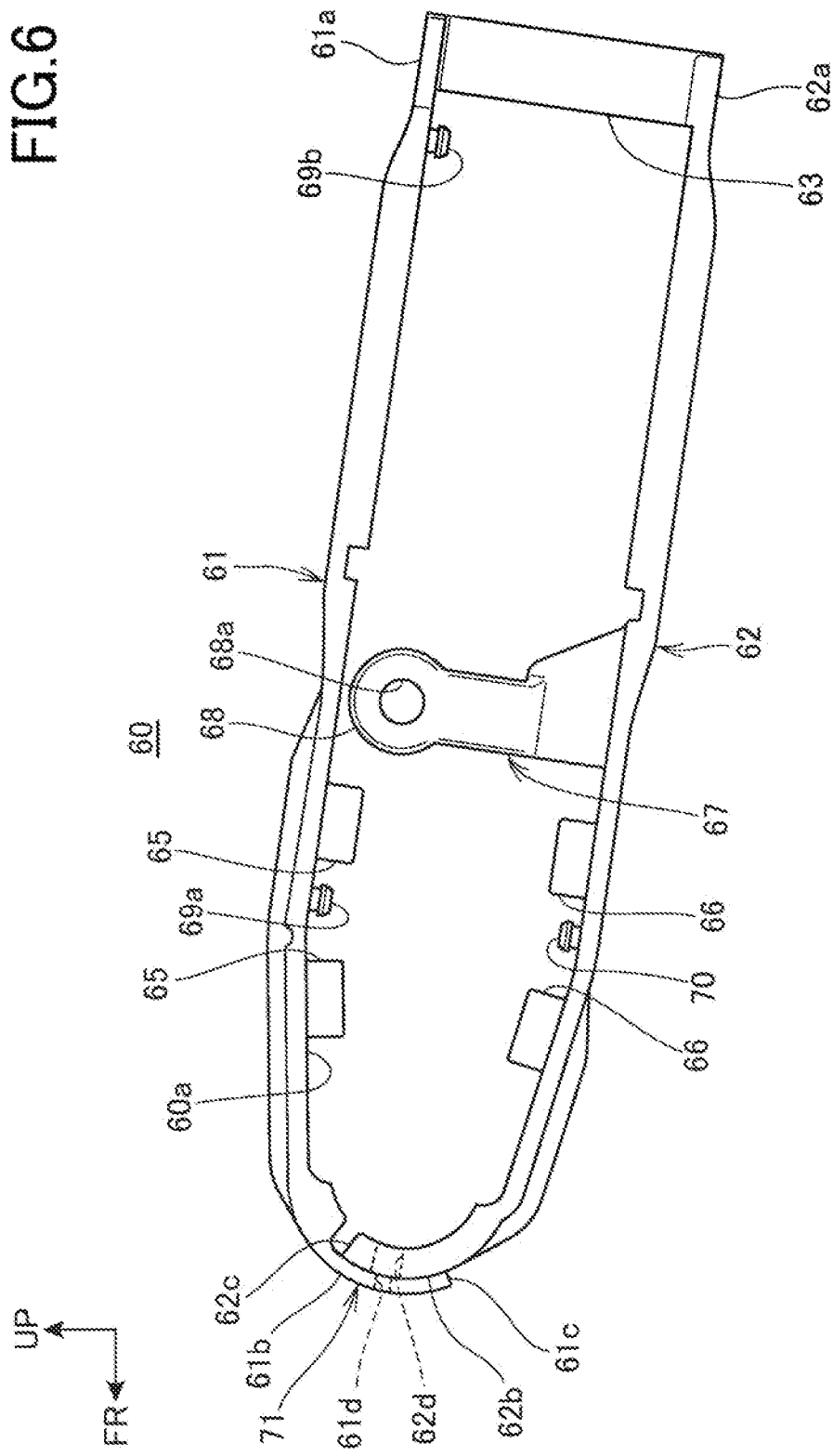
FIG. 6 is a left side view illustrating the chain slider.
Figure 7:
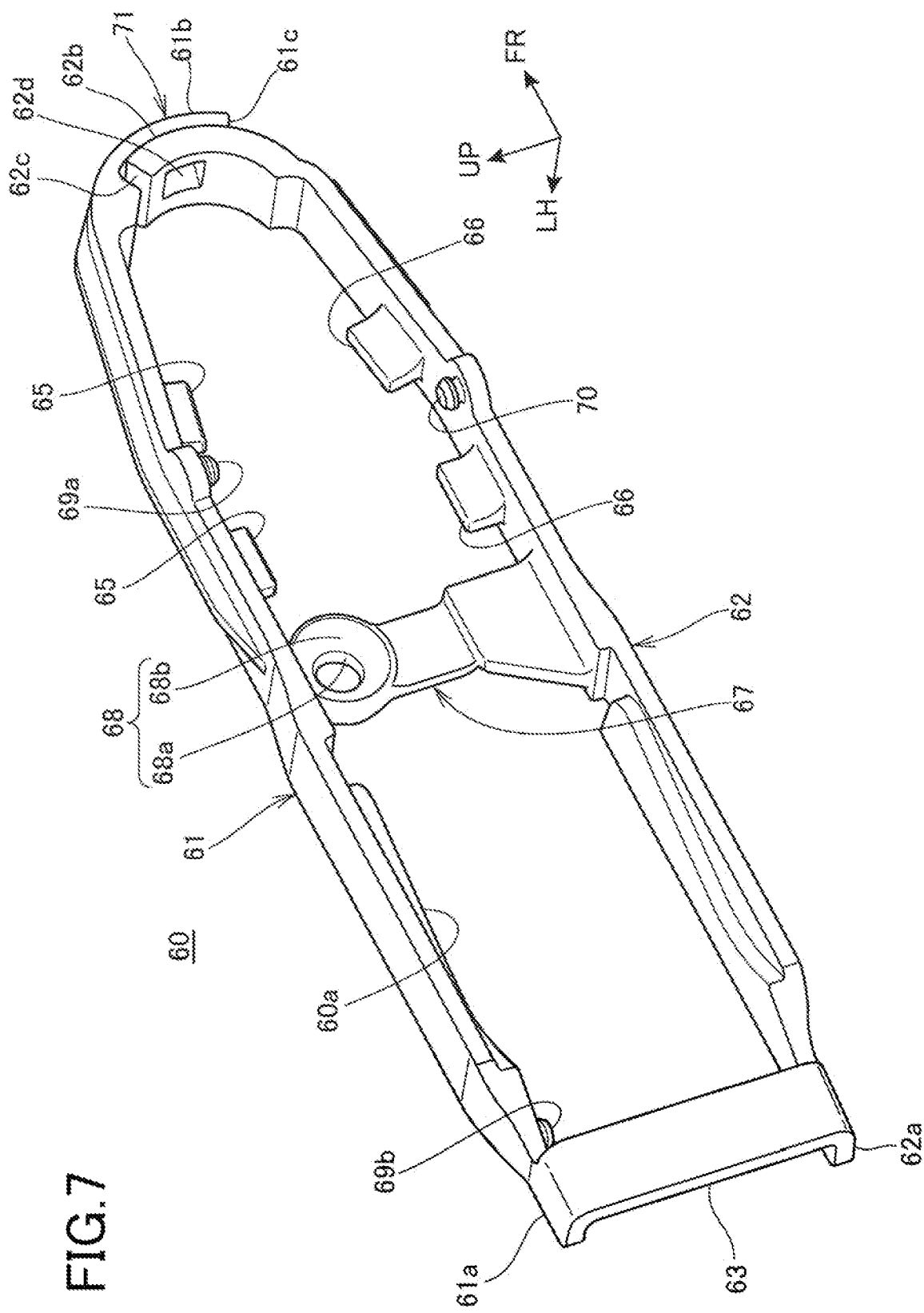
FIG. 7 is a perspective view illustrating the chain slider as viewed from an inner side in a vehicle width direction.

FIG. 5 is a plan view illustrating the swingarm 16 to which the chain slider 60 has been attached, as viewed from above. FIG. 6 is a left side view illustrating the chain slider 60. FIG. 7 is a perspective view illustrating the chain slider 60 as viewed from the inner side in the vehicle width direction.

Referring to FIGS. 2 and 5 to 7, the chain slider 60 is attached to the left arm portion 41.

The chain slider 60 receives the chain 33 in the vertical direction, and has sliding contact with the chain 33. The chain slider 60 protects the arm portion 41 from the chain 33. The chain slider 60 is formed of a material having low friction with respect to the chain 33 such that the chain 33 travels smoothly.

The chain slider 60 is integrally provided with an upper slider portion 61, a lower slider portion 62, and a vertical connection portion 63. The upper slider portion 61 is attached to the upper surface 41c of the arm portion 41. The lower slider portion 62 is attached to the lower surface 41e of the arm portion 41. The vertical connection portion 63 vertically connects a rear end portion 61a of the upper slider portion 61 and a rear end portion 62a of the lower slider portion 62.

The chain slider 60 has an open loop shape in which a front end portion 61b of the upper slider portion 61 and a front end portion 62b of the lower slider portion 62 are formed to be separable from each other.

The upper slider portion 61 has a band shape extending long in the vehicle front-rear direction along the upper surface 41c. A lower surface of the upper slider portion 61 abuts on the upper surface 41c.

The lower slider portion 62 has a band shape extending long in the vehicle front-rear direction along the lower surface 41e. An upper surface of the lower slider portion 62 abuts on the lower surface 41e.

The vertical connection portion 63 has a band shape vertically extending long along an inner side surface 41g, in the vehicle width direction, of the arm portion 41.

The vertical connection portion 63 vertically connects an end portion on the inner side, in the vehicle width direction, in the rear end portion 61a of the upper slider portion 61, and an end portion on the inner side, in the vehicle width direction, in the rear end portion 62a of the lower slider portion 62.

The front end portion 61b of the upper slider portion 61 is disposed along the front surface 43a of the pivot coupling portion 43. The front end portion 61b of the upper slider portion 61 extends frontward and downward while being curved in an arc shape along the front surface 43a. A lower end 61c of the front end portion 61b is located below a center 43b (illustrated in FIG. 2) of the pivot coupling portion 43, in vehicle side view. The center 43b is a swinging center of the swingarm 16.

The front end portion 62b of the lower slider portion 62 is disposed along the front surface 43a of the pivot coupling portion 43. The front end portion 62b of the lower slider portion 62 extends frontward and upward while being curved in an arc shape along the front surface 43a. An upper end 62c of the front end portion 62b is located above the center 43b, in vehicle side view.

The front end portion 61b of the upper slider portion 61 and the front end portion 62b of the lower slider portion 62 can overlap and contact with each other.

As illustrated in FIGS. 6 and 7, the chain slider 60 alone is formed in a loop shape by the upper slider portion 61, the vertical connection portion 63, and the lower slider portion 62 with overlapping of the front end portion 61b and the front end portion 62b.

However, when the chain slider 60 is alone, the front end portion 61b and the front end portion 62b are actually not connected, and thus are separated. That is, the chain slider 60 has an open loop shape in which the front end portion 61b and the front end portion 62b are not connected.

The chain slider 60 is formed of an elastomer such as rubber, or synthetic resin, and thus is highly flexible. Therefore, the chain slider 60 can be easily deformed to separate the front end portion 61b and the front end portion 62b.

The loop shape of the chain slider 60 is a rectangular shape extending long in the vehicle front-rear direction, in vehicle side view.

Referring to FIGS. 2 and 5 to 7, the front end portion 61b of the upper slider portion 61 and the front end portion 62b of the lower slider portion 62 overlap with each other, in the vehicle front-rear direction, in front of the front surface 43a of the pivot coupling portion 43.

Specifically, the front end portion 62b of the lower slider portion 62 is sandwiched between the front surface 43a of the pivot coupling portion 43 and the front end portion 61b of the upper slider portion 61. That is, the front end portion 62b of the lower slider portion 62 covers the front surface 43a of the pivot coupling portion 43 from a front side of the front surface 43a. Simultaneously, the front end portion 61b of the upper slider portion 61 covers the front end portion 62b of the lower slider portion 62 from a front side of the front end portion 62b.

The front end portion 61b of the upper slider portion 61 is provided with an outer engagement hole 61d penetrating through the front end portion 61b in a plate thickness direction thereof. In a state illustrated in FIG. 2, the outer engagement hole 61d penetrates through the front end portion 61b in the vehicle front-rear direction. The outer engagement hole 61d is a slit-shaped hole that is long in the vertical direction.

The front end portion 62b of the lower slider portion 62 is provided with an inner engagement hole 62d penetrating through the front end portion 62b in a plate thickness direction thereof. In the state illustrated in FIG. 2, the inner engagement hole 62d penetrates through the front end portion 62b in the vehicle front-rear direction. The inner engagement hole 62d is a slit-shaped hole that is long in the vertical direction.

The inner engagement hole 62d is larger than the outer engagement hole 61d in the vertical direction and in the vehicle width direction.

The inner engagement hole 62d and the outer engagement hole 61d communicate with each other. The engagement projection 55 engages with the inner engagement hole 62d and the outer engagement hole 61d.

Referring to FIGS. 2, 6, and 7, the chain slider 60 includes upper positioning portions 65 (positioning portions) and lower positioning portions 66 (positioning portions). The upper positioning portions 65 and the lower positioning portions 66 abut on the outer side surface 41d, in the vehicle width direction, of the arm portion 41.

The upper positioning portions 65 are projections extending downward from the lower surface of the upper slider portion 61. The lower surface of the upper slider portion 61 forms an inner peripheral surface 60a of the looped chain slider 60.

The upper positioning portions 65 are disposed close to the outer side, in the vehicle width direction, on the lower surface of the upper slider portion 61. The multiple upper positioning portions 65 are provided in a front portion of the upper slider portion 61 such that the upper positioning portions 65 are aligned in the front-rear direction.

The upper positioning portions 65 are disposed between the pivot coupling portion 43 and the chain cover 34 in the vehicle front-rear direction. The upper positioning portions 65 abut on an upper portion of the outer side surface 41d in the front arm portion 41a.

The lower positioning portions 66 are projections extending upward from the upper surface of the lower slider portion 62. The upper surface of the lower slider portion 62 forms the inner peripheral surface 60a.

The lower positioning portions 66 are disposed close to the outer side, in the vehicle width direction, on the upper surface of the lower slider portion 62. The multiple lower positioning portions 66 are provided in a front portion of the lower slider portion 62 such that the lower positioning portions 66 are aligned in the front-rear direction.

The lower positioning portions 66 are disposed between the pivot coupling portion 43 and the chain cover 34 in the vehicle front-rear direction. The lower positioning portions 66 abut on a lower portion of the outer side surface 41d in the front arm portion 41a.

The chain slider 60 also includes an extending portion 67 extending upward from the upper surface of the lower slider portion 62. The extending portion 67 is a vertically long plate-shaped portion.

The extending portion 67 is disposed close to the outer side, in the vehicle width direction, on the upper surface of the lower slider portion 62. The extending portion 67 is provided in an intermediate portion between the front portion and a rear portion of the lower slider portion 62, and is located rearward of the lower positioning portions 66.

The extending portion 67 is located on the outer side, in the vehicle width direction, of the outer side surface 41d of the arm portion 41. The extending portion 67 extends upward along the outer side surface 41d. The extending portion 67 includes a fixed portion 68 at an upper end portion thereof. The fixed portion 68 is fixed to the protruding portion 52 of the arm portion 41. The fixed portion 68 is proximate to the upper slider portion 61 from below.

The fixed portion 68 includes a hole portion 68a penetrating through the fixed portion 68 in the vehicle width direction, and an annular guide surface 68b provided around the hole portion 68a.

The fixed portion 68 is attached to the protruding portion 52 by inserting the protruding portion 52 into the hole portion 68a. The hole portion 68a engages with the groove portion 52a on the outer periphery of the protruding portion 52.

The guide surface 68b is a surface facing the outer side surface 41d of the arm portion 41 from the outer side in the vehicle width direction. The guide surface 68b has a tapered shape whose diameter decreases toward a tip end of the protruding portion 52.

When the fixed portion 68 is fitted to the protruding portion 52, the tapered guide surface 68b receives the tip end portion of the protruding portion 52. Thus, it is possible to easily fit the fixed portion 68 to the protruding portion 52.

The chain slider 60 further includes upper projections 69a, 69b protruding downward from the lower surface of the upper slider portion 61, and a lower projection 70 protruding upward from the upper surface of the lower slider portion 62.

The upper projection 69a is provided in the front portion of the upper slider portion 61. The upper projection 69b is provided in a rear portion of the upper slider portion 61. The upper projections 69a, 69b are located on the inner side in the vehicle width direction with respect to the upper positioning portions 65. The upper projection 69a engages with the hole 51a (illustrated in FIG. 4) of the arm portion 41, and the upper projection 69b engages with the hole 51b.

The lower projection 70 is provided in the front portion of the lower slider portion 62. The lower projection 70 is located on the inner side in the vehicle width direction with respect to the lower positioning portions 66.

The lower projection 70 engages with a hole (not illustrated) provided on the lower surface 41e of the arm portion 41.

Here, an example of a procedure for attaching the chain slider 60 to the swingarm 16 will be described.

First, the upper slider portion 61 and the lower slider portion 62 are opened in the vertical direction. Thus, the chain slider 60 is placed in a state where the front end portion 61b and the front end portion 62b are separated from each other in the vertical direction.

Next, the chain slider 60 is placed on the arm portion 41. This placement is made in such a manner that the front end portion 61b and the front end portion 62b pass the cross member 44 and the arm portion 41 while the cross member 44 and the arm portion 41 are interposed between the front end portion 61b and the front end portion 62b.

The upper slider portion 61 is fixed to the upper surface 41c of the arm portion 41 by engaging the upper projections 69a, 69b with the holes 51a, 51b, respectively.

The upper slider portion 61 is positioned in the vehicle width direction by abutment of the upper positioning portions 65 on the outer side surface 41d of the arm portion 41 from the outer side in the vehicle width direction.

The lower slider portion 62 is fixed to the lower surface 41e of the arm portion 41 by engaging the lower projection 70 with the above-described hole on the lower surface 41e.

The lower slider portion 62 is positioned in the vehicle width direction by abutment of the lower positioning portions 66 on the outer side surface 41d of the arm portion 41 from the outer side in the vehicle width direction.

Further, the lower slider portion 62 is fixed to the protruding portion 52 of the arm portion 41 by engaging the fixed portion 68 of the extending portion 67 with the groove portion 52a of the protruding portion 52. The fixed portion 68 is retained so as not to come off by the attachment portion 34d, fastened to the outer end surface of the protruding portion 52, of the chain cover 34.

The chain slider 60 is positioned in the vehicle width direction and in the vehicle front-rear direction by abutment of the vertical connection portion 63 on the inner side surface 41g of the arm portion 41. Since the inner side surface 41g is inclined so as to be located on the outer side in the vehicle width direction as it extends rearward, the vertical connection portion 63 can be positioned in the vehicle width direction and in the vehicle front-rear direction. The vertical connection portion 63 is located rearward of the cross member 44.

The front end portion 61b of the upper slider portion 61 and the front end portion 62b of the lower slider portion 62 are located in front of the front surface 43a of the pivot coupling portion 43. An overlapping portion 71, in which the front end portion 61b and the front end portion 62b overlap with each other, is formed on the front surface 43a.

In the overlapping portion 71, the front end portion 61b and the front end portion 62b overlap with each other in the vehicle front-rear direction. Specifically, the front end portion 61b overlaps with the front end portion 62b from the front side of the front end portion 62b. In the overlapping portion 71, the plate thickness of the front end portion 61b is smaller than the plate thickness of the front end portion 62b.

The engagement projection 55 on the front surface 43a of the pivot coupling portion 43 engages with the inner engagement hole 62d and the outer engagement hole 61d from a rear side, in the overlapping portion 71.

The engagement projection 55 passes frontward through the inner engagement hole 62d and the outer engagement hole 61d. Then, the claw portion 57 in a tip end portion of the engagement projection 55 protrudes frontward with respect to the front end portion 61b. The claw portion 57 is inserted into the outer engagement hole 61d so as to vertically expand the outer engagement hole 61d.

A vertical width of the claw portion 57 is larger than a vertical width of the outer engagement hole 61d. Thus, the front end portion 61b and the front end portion 62b can be retained so as not to come off from the engagement projection 55 by the claw portion 57.

The front end portion 61b and the front end portion 62b are connected to each other by engaging the engagement projection 55 with the inner engagement hole 62d and the outer engagement hole 61d. In this state, the shape of the chain slider 60 is changed into a closed loop shape. The closed looped chain slider 60 is positioned in the vehicle front-rear direction by abutment of the front end portion 61b and the front end portion 62b on the front surface 43a of the pivot coupling portion 43.

The engagement projection 55 having engaged with the inner engagement hole 62d and the outer engagement hole 61d positions the overlapping portion 71 in the vehicle front-rear direction, in the vehicle width direction, and in the vertical direction.

The chain slider 60 alone has an open loop shape in which the front end portion 61b and the front end portion 62b are separable. Thus, the chain slider 60 can be attached to the swingarm 16 even when the rear wheel 15 has been mounted on the swingarm 16.

In contrast, the chain slider 60 has a closed loop shape when the engagement projection 55 engages with the front end portion 61b and the front end portion 62b. Thus, the chain slider 60 is firmly fixed to the swingarm 16 so as to be wound around the swingarm 16.

Therefore, the number can be reduced regarding the holes 51a, 51b engaged by the upper projections 69a, 69b, and the above-described hole engaged by the lower projection 70. Thus, rigidity of the swingarm 16 can be improved.

Referring to FIGS. 1 and 2, the overlapping portion 71 and the engagement projection 55 are disposed between the upper portion 33a and the lower portion 33b of the chain 33 in the vertical direction, and are disposed between the drive sprocket 31 and the pivot coupling portion 43 in the vehicle front-rear direction. Thus, the overlapping portion 71 and the engagement projection 55 are located far from the traveling route of the chain 33. Therefore, the chain 33 can avoid contact with the overlapping portion 71 and the engagement projection 55, and thus the chain slider 60 can be appropriately fixed to the swingarm 16. Further, the overlapping portion 71 and the engagement projection 55 do not interfere with the traveling of the chain 33.

As described above, according to the embodiment to which the present invention is applied, the saddle-ride vehicle 10 includes the swingarm 16 that extends in the vehicle front-rear direction and that swingably supports the rear wheel 15, the chain 33 that is disposed along the upper surface 41c and the lower surface 41e of the swingarm 16 and that transmits the driving force of the power unit 12 to the rear wheel 15, and the chain slider 60 that is attached to the swingarm 16 and that has sliding contact with the chain 33. The chain slider 60 is integrally provided with the upper slider portion 61 that is attached to the upper surface 41c of the swingarm 16, the lower slider portion 62 that is attached to the lower surface 41e of the swingarm 16, and the vertical connection portion 63 that vertically connects the rear end portion 61a of the upper slider portion 61 and the rear end portion 62a of the lower slider portion 62, while the chain slider 60 has an open loop shape in which the front end portion 61b of the upper slider portion 61 and the front end portion 62b of the lower slider portion 62 are formed to be separable from each other. The swingarm 16 has the engagement projection 55 that is provided in the front portion of the swingarm 16 and that protrudes outward from the surface of the swingarm 16. The front end portion 61b of the upper slider portion 61 and the front end portion 62b of the lower slider portion 62 engage with the engagement projection 55 in the state where the front end portion 61b of the upper slider portion 61 and the front end portion 62b of the lower slider portion 62 overlap with each other.

According to this configuration, when the open looped chain slider 60 is attached to the swingarm 16, the front end portion 61b of the upper slider portion 61 and the front end portion 62b of the lower slider portion 62 engage with the engagement projection 55 in the state where the front end portion 61b of the upper slider portion 61 and the front end portion 62b of the lower slider portion 62 overlap with each other. Then, the shape of the chain slider 60 is changed into a closed loop shape. Thus, when the attachment is performed, the open looped chain slider 60 is engaged with the swingarm 16. Therefore, the chain slider 60 can be easily attached to and detached from the swingarm 16 without detaching the rear wheel 15. Further, after the chain slider 60 is engaged with the engagement projection 55, the shape of the chain slider 60 is changed into a closed loop shape. Thus, the chain slider 60 can be fixed to the swingarm 16 without bolt fastening, or engagement made through a large number of engagement portions. This eliminates the need to provide, in the swingarm 16, a large number of hole portions for fastening or engagement. Therefore, this configuration easily ensures rigidity of the swingarm 16, increases a degree of freedom in shape of the swingarm 16, and contributes to downsizing.

Further, the front end portion 61*b* of the upper slider portion 61 engages with the engagement projection 55 while the front end portion 61*b* of the upper slider portion 61 overlaps, from the outer side of the front end portion 62*b* of the lower slider portion 62, with the front end portion 62*b* of the lower slider portion 62 that engages with the engagement projection 55.

According to this configuration, the front end portion 61*b* of the upper slider portion 61 overlaps with the front end portion 62*b* of the lower slider portion 62 from the outer side. Thus, a connecting portion between the front end portion 61*b* of the upper slider portion 61 and the front end portion 62*b* of the lower slider portion 62 is hardly seen from above. Therefore, appearance is improved. In addition, dust, water, and the like hardly enter between the front end portion 61*b* of the upper slider portion 61 and the front end portion 62*b* of the lower slider portion 62 from above. Thus, the chain slider 60 has a high antifouling property.

Further, the vertical connection portion 63 abuts on the inner side surface 41*g*, in the vehicle width direction, of the swingarm 16.

According to this configuration, the rear end portions of the chain slider 60 can be positioned in the vehicle width direction and in the front-rear direction by the vertical connection portion 63. In addition, the vertical connection portion 63 is covered by the swingarm 16 from the outer side in the vehicle width direction. Thus, appearance is improved.

Further, the chain slider 60 includes the upper positioning portions 65 and the lower positioning portions 66 as positioning portions that abut on the outer side surface 41*d*, in the vehicle width direction, of the swingarm 16.

According to this configuration, the chain slider 60 can be positioned in the vehicle width direction by the upper positioning portions 65 and the lower positioning portions 66.

In addition, the chain slider 60 includes the extending portion 67 that is provided frontward of the vertical connection portion 63. The extending portion 67 extends, along the outer side surface 41*d* of the swingarm 16, from the lower slider portion 62. The extending portion 67 engages with the protruding portion 52 that is provided on the outer side surface 41*d*.

According to this configuration, the extending portion 67 engages with the protruding portion 52 on the outer side surface 41*d* of the swingarm 16. Thus, the chain slider 60 can be positioned also on the outer side surface in the width direction without providing a hole portion in the swingarm 16.

The extending portion 67 includes the hole portion 68*a* into which the protruding portion 52 is inserted, and the annular guide surface 68*b* that is provided around the hole portion 68*a*. The groove portion 52*a* is provided on the outer periphery of the protruding portion 52. The hole portion 68*a* engages with the groove portion 52*a*, and the guide surface 68*b* has a tapered shape whose diameter decreases toward the tip end of the protruding portion 52.

According to this configuration, the hole portion 68*a* of the extending portion 67 engages with the groove portion 52*a* on the outer periphery of the protruding portion 52. Thus, the chain slider 60 can be positioned in the front-rear direction, in the vehicle width direction, and in the vertical direction. In addition, the guide surface 68*b* has a tapered shape, and thus the hole portion 68*a* can be easily attached to the protruding portion 52.

The chain cover 34 that covers the chain 33 from above is provided, and the chain cover 34 includes the attachment portion 34*d* that is attached to the protruding portion 52. The extending portion 67 is retained so as not to come off by the attachment portion 34*d*.

According to this configuration, the extending portion 67 of the chain slider 60 can be supported by using the protruding portion 52 to which the chain cover 34 is attached. Further, the extending portion 67 can be retained so as not to come off with a simple structure using the attachment portion 34*d* of the chain cover 34.

The engagement projection 55 protrudes frontward from the front surface 43*a* of the swingarm 16.

According to this configuration, the engagement projection 55 is provided on the front surface 43*a* of the swingarm 16. Thus, the engagement projection 55 does not interfere with the chain 33 that is disposed along the upper surface 41*c* and the lower surface 41*e* of the swingarm 16. Therefore, the engagement projection 55 can be provided without causing any influence on the chain 33.

Further, in the overlapping portion 71 where the front end portion 61*b* of the upper slider portion 61 and the front end portion 62*b* of the lower slider portion 62 overlap with each other, the front end portions 61*b*, 62*b* overlap with each other, in the vehicle front-rear direction, in front of the front surface 43*a* of the swingarm 16.

According to this configuration, the overlapping portion 71 can be spaced apart from the chain 33 that is disposed along the upper surface 41*c* and the lower surface 41*e* of the swingarm 16. Thus, contact of the chain 33 with the overlapping portion 71 can be prevented.

The above embodiment illustrates one aspect to which the present invention is applied, and the present invention is not limited to the above embodiment.

In the above embodiment, a description has been made in a case where the extending portion 67 extends from the lower slider portion 62. However, the extending portion 67 may extend from at least one of the upper slider portion 61 or the lower slider portion 62. For example, the extending portion 67 may extend downward from the upper slider portion 61.

In the above embodiment, an example has been illustrated in which the saddle-ride vehicle 10 is a motorcycle. However, the present invention is not limited to this. The present invention can be applied to a three-wheeled saddle-ride vehicle including two front wheels or two rear wheels, and a saddle-ride vehicle including four or more wheels.

REFERENCE SIGNS LIST

10 saddle-ride vehicle
12 power unit
15 rear wheel (wheel)
16 swingarm
33 chain 34 chain cover
34d attachment portion
41c upper surface
41d outer side surface (side surface)
41e lower surface
41g inner side surface
43a front surface
52 protruding portion
52a groove portion
55 engagement projection
60 chain slider
61 upper slider portion
61a rear end portion
61b front end portion
62 lower slider portion
62a rear end portion
62b front end portion
63 vertical connection portion
65 upper positioning portion (positioning portion)
66 lower positioning portion (positioning portion)
67 extending portion
68a hole portion
68b guide surface
71 overlapping portion

What is claimed is:

1. A saddle-ride vehicle comprising: a swingarm that extends in a vehicle front-rear direction and that swingably supports a wheel; a chain that is disposed along an upper surface and a lower surface of the swingarm and transmits driving force of a power unit to the wheel; and a chain slider that is configured to be attached to the swingarm and that is configured to have sliding contact with the chain,
   wherein the chain slider is integrally provided with an upper slider portion that is configured to be attached to the upper surface of the swingarm, a lower slider portion that is configured to be attached to the lower surface of the swingarm, and a vertical connection portion that vertically connects a rear end portion of the upper slider portion and a rear end portion of the lower slider portion, while the chain slider has an open loop shape in which a front end portion of the upper slider portion and a front end portion of the lower slider portion are formed to be separable from each other,
   the swingarm has an engagement projection that is provided in a front portion of the swingarm and that protrudes outward from a surface of the swingarm, and
   the front end portion of the upper slider portion and the front end portion of the lower slider portion are configured to engage with the engagement projection in a state where the front end portion of the upper slider portion and the front end portion of the lower slider portion overlap with each other.

2. The saddle-ride vehicle according to claim 1, wherein the front end portion of the upper slider portion is configured to engage with the engagement projection while the front end portion of the upper slider portion overlaps, from an outer side of the front end portion of the lower slider portion, with the front end portion of the lower slider portion that engages with the engagement projection.

3. The saddle-ride vehicle according to claim 1, wherein the vertical connection portion is configured to abut on an inner side surface, in a vehicle width direction, of the swingarm.

4. The saddle-ride vehicle according to claim 1, wherein the chain slider includes a positioning portion that is configured to abut on an outer side surface, in a vehicle width direction, of the swingarm.

5. The saddle-ride vehicle according to claim 1,
   wherein the chain slider includes an extending portion that is provided frontward of the vertical connection portion and that extends, along a side surface of the swingarm, from at least one of the upper slider portion or the lower slider portion, and
   the extending portion is configured to engage with a protruding portion that is provided on the side surface.

6. The saddle-ride vehicle according to claim 5,
   wherein the extending portion includes a hole portion into which the protruding portion is configured to be inserted, and an annular guide surface that is provided around the hole portion,
   a groove portion is provided on an outer periphery of the protruding portion, and
   the hole portion is configured to engage with the groove portion, and the guide surface has a tapered shape whose diameter decreases toward a tip end of the protruding portion.

7. The saddle-ride vehicle according to claim 5, further comprising a chain cover that covers the chain from above, the chain cover including an attachment portion that is configured to be attached to the protruding portion,
   wherein the extending portion is configured to be retained so as not to come off by the attachment portion.

8. The saddle-ride vehicle according to claim 1, wherein the engagement projection is configured to protrude frontward from a front surface of the swingarm.

9. The saddle-ride vehicle according to claim 8, wherein in an overlapping portion where the front end portion of the upper slider portion and the front end portion of the lower slider portion overlap with each other, the front end portions overlap with each other, in the vehicle front-rear direction, in front of the front surface of the swingarm.

* * * * *